Dec. 20, 1960

J. H. BOLLES ET AL 2,965,765

BATTERY CHARGING CIRCUIT

Original Filed Feb. 23, 1955

INVENTORS
JULIUS H. BOLLES
LYMAN A. RICE
PAUL L. SCHNEIDER

BY

THEIR ATTORNEY

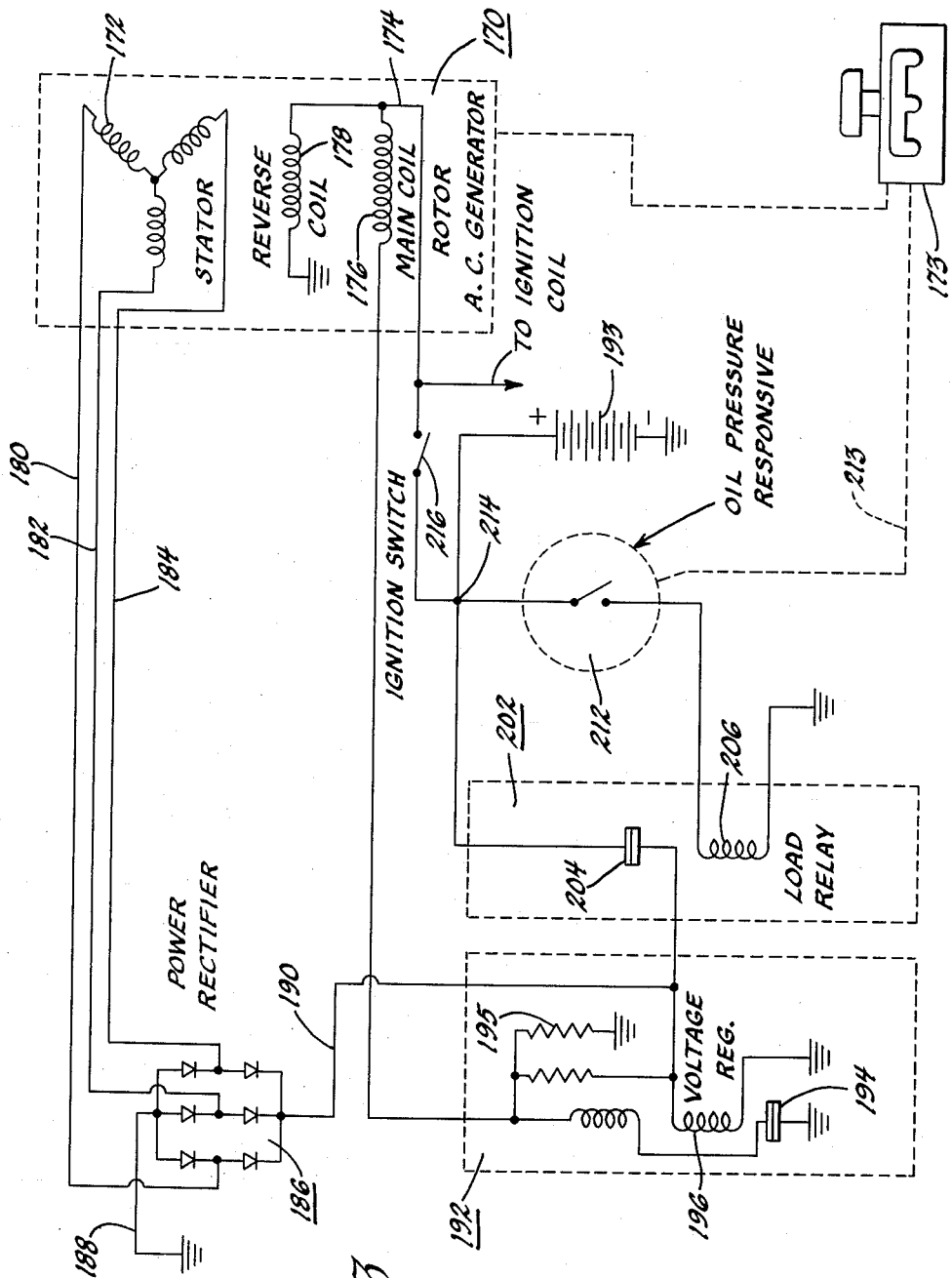

United States Patent Office 2,965,765
Patented Dec. 20, 1960

2,965,765

BATTERY CHARGING CIRCUIT

Julius H. Bolles, Lyman A. Rice, and Paul L. Schneider, Anderson, Ind., assignors to General Motors Corporation, Detroit, Mich., a corporation of Delaware Original application Feb. 23, 1955, Ser. No. 489,966, now Patent No. 2,858,497, dated Oct. 28, 1958. Divided and this application Jan. 10, 1958, Ser. No. 714,452

4 Claims. (Cl. 290—50)

This invention relates to storage battery charging circuits and more particularly to systems wherein a storage battery is charged by an A.C. generator which is driven by a variable speed prime mover such as an engine of an automotive vehicle.

This is a divisional application of copending parent application S.N. 489,966, filed February 23, 1955, and now Patent 2,858,497, issued October 28, 1958.

The object of the present invention is to automatically connect an A.C. generator and rectifier to a storage battery whenever the generator is operating and to disconnect the generator and rectifier from the battery circuit when operation of said generator ceases.

Another object of the present invention is to control the charging circuit for a storage battery, which includes a rectifier and an alternator that is driven by a variable speed prime mover, by a switch means that is responsive to the operation of the prime mover.

A further object of the present invention is to control the output of an A.C. generator which charges a storage battery through a rectifier so the circuit to the storage battery is automatically closed only when the generator is operating.

Another object of the present invention is to include a switch means in a circuit between a storage battery and a rectifier which converts the A.C. output of an alternator to D.C. current and voltage which switch means is responsive to the output of the alternator.

A still further object of the present invention is to include a current responsive relay switch means between a storage battery and an A.C. generator which has its output converted to D.C. current by a rectifier, said switch means having an electro-magnetic coil winding in series with a resistance, the ohmic value of which varies inversely with temperature, and the output terminal of the rectifier having a heating element for said resistance connected with the output of said generator, whereby the heating element, when properly energized by said generator, lowers the ohmic value of said resistance for increasing the flow of current through said coil winding, whereby the closing of the circuit to said battery is accomplished.

Another object of the present invention is to include a centrifugal switch in the field circuit of a variable speed A.C. generator that charges a storage battery through a rectifier, so the circuit between said battery and field will be closed by said switch whenever the speed of said generator exceeds a predetermined value.

A further object of the present invention is to mount a pair of centrifugal switches on the rotatable shaft of an A.C. generator that charges a storage battery through a rectifier, said switches being circuited so the output of the rectifier and battery to the main and bucking fields of the generator is controlled, so that the main field circuit is closed when the generator speed reaches a predetermined value, and the bucking field circuit is closed when the speed of the generator exceeds another predetermined value, which is higher than said first speed.

Further objects and advantages of the present invention will be apparent from the following description, reference being had to the accompanying drawings wherein a preferred embodiment of the present invention is clearly shown.

In the drawings:

Figure 3 shows a wire diagram of another modification of the present invention wherein the connection between the generator rectifier and the battery is controlled in response to the operation of the prime mover.

Figure 1:
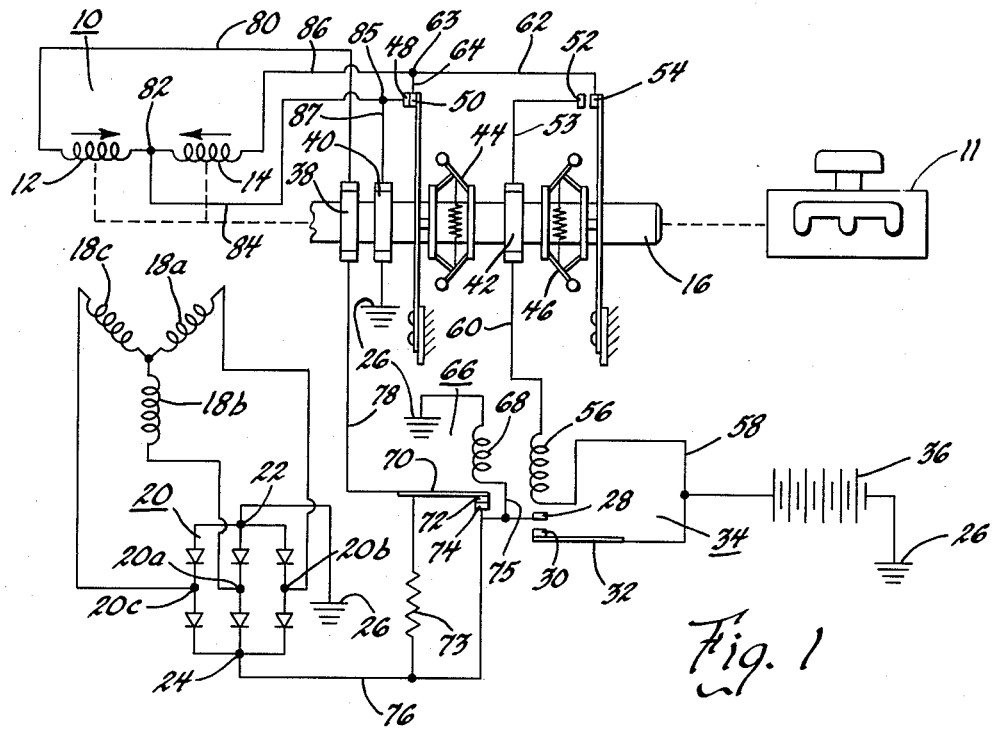
Figure 1 shows a wiring diagram of a storage battery charging circuit schematically showing a means for connecting the generator and rectifier to the battery according to the present invention.

In the drawings and particularly in Figure 1, the numeral 10 designates a variable speed alternator which may be of the type that is used on motor vehicles for battery charging and other auxiliary purposes and in which the speed of the alternator varies with the speed of the vehicle driving motor 11. The alternator 10 is wound to have a main field winding 12 and a bucking field winding 14 that is wound to oppose the exciting magnetic flux of the main field 12 when current is passed therethrough. The alternator 10 may be of the inductor type and is shown as a three-phase alternator having star connected inductor windings 18a, 18b and 18c. The inductor windings 18a, 18b and 18c are connected to the alternating current terminals 20a, 20b and 20c, respectively, of the three-phase bridge type rectifier 20, which may be of the dry plate type having direct current terminals 22 and 24. The terminal 22 is grounded as at 26. The terminal 24 of rectifier 20 is connected to a stationary contact 28 of line relay 34 which has a movable contact 30, carried on an armature 32, which engages contact 28 and thus connects terminal 24 with one terminal of a storage battery 36 which has the other terminal grounded at 26.

The alternator 10 has a rotatable shaft 16 which is driven by engine 11 and provided with three spaced commutating rings 38, 40 and 42 and a pair of centrifugally responsive switches 44 and 46. The switches 44 and 46 may be of any of the well known types, the construction of which forms no part of the present invention.

The switch 44 is arranged so its contacts 48 and 50 are normally closed at low alternator speeds and are adapted to be opened when the rotation of shaft 16 increases and exceeds a predetermined rotational speed. The switch 46 has its contacts 52 and 54 arranged so that they are normally open at low alternator speeds. The parts of switch 46 are arranged to close contacts 52 and 54 when alternator shaft 16 increases and exceeds another and preferably higher predetermined speed of rotation.

The present invention is directed to a system whereby the generator 10 and rectifier 20 are connected to the storage battery 36 only during the periods when the generator 10 is operating to produce a charging current. This connection is accomplished by the line relay 34 which is controlled by other means which will be hereinafter described.

In the circuit as shown in Figure 1, the relay 34 has a magnetic coil winding 56 that is adapted to attract a movable relay armature 32 and close contacts 28 and 30. The winding 56 is adapted to be energized from battery 36 through a circuit that includes: wire 58, wire 60, slip ring 42, contacts 52 and 54, these contacts are closed by the centrifugal switch 46 when the generator 10 has reached a predetermined rotational speed, wire 62, junction 63, wire 64, closed contacts 48 and 50 and slip ring 40 which is connected to ground 26.

The system also includes a voltage regulator 66 which is adapted to control the excitation of the main field 12 in response to the output potential of rectifier 20. The regulator 66 is provided with an exciting winding 68, and an armature 70 that carries a movable contact 72 which is adapted to normally engage a stationary contact 74 and be moved out of engagement therewith when the winding 68 is sufficiently excited. The excitation of winding 68 is accomplished through a circuit that is connected to the output terminal 24 of rectifier 20 by wires 75 and 76. The main field 12 is connected with the output terminal 24 of the rectifier and the regulator 66 through a circuit that includes: wire 76, closed contacts 72 and 74, armature 70, wire 78, slip rings 38, and wire 80 which is connected to one end of field 12. The other end of the field 12 is connected through a junction 82, a wire 84 and slip rings 40 to ground 26 so that the circuit from the output terminal 24 of the rectifier 20 to field 12 may be controlled by the contacts 72 and 74 of the voltage regulator. Thus when contacts 72 and 74 are open, the circuit to field 12 is open. This opening and closing of the contacts 72 and 74 occurs with a high frequency so that the energization of field 12 is constantly controlled. The resistance 73 is included in the circuit to minimize the arcing across contacts 72 and 74 as they open.

The bucking field 14 of the alternator 10 is normally controlled by switch 44 and is energized by the output of battery 36 when normally closed switch 44 opens. This excitation is accomplished through a circuit that includes wire 58, winding 56, which forms the coil winding of relay 34, wire 60, slip rings 42, wire 53, the closed contacts 52 and 54, wire 62, junction 63, and wire 86 which is connected to one end of field 14. The other end of field 14 is connected through junction 82, wire 84, junction 85, wire 87, and slip rings 40 with ground 26. From the above circuits, it is apparent that when the alternator is operating at low speeds so that switch 44 causes contacts 48 and 50 to be closed, the bucking field 14 will be shunted by a circuit which includes wire 62, junction 63, a wire 64, closed contacts 48 and 50, wire 61, junction 85, wire 87 and slip rings 40 which are connected to ground 26. When, however, the alternator speed increases beyond a predetermined value, the centrifugal switch means 44 causes contacts 48 and 50 to open. When contacts 48 and 50 open, the shunt circuit will be broken and the current from wire 62 will be directed from junction 63 through the bucking field and returned from junction 82 through wire 84 and slip rings 40 to ground 26.

From the above it is apparent that when the alternator exceeds a predetermined rotational speed, switch means 46 will cause normally open contacts 52 and 54 to close and cause the winding 56 to be energized and close contacts 28 and 30 and thereby connect the output terminal 24 of the rectifier through the closed contacts 28 and 30 to battery 36. When contacts 28 and 30 are closed, the circuit to the main field 12 from battery 36 is also completed so that the alternator may be excited by the battery 36. This circuit includes the normally closed contacts 72 and 74. In the event that the output potential of the generator exceeds a predetermined value, the winding 68 will be sufficiently energized in response to the potential at terminal 24 to cause contacts 72 and 74 to open and break the connection to the exciting field 12 and thus reduce the output of the generator. The bucking field 14 of the alternator is included in the generator to aid the regulation at high speeds. It is well known that if this field 14 is energized at low speeds, the generator performance is impaired. This deficiency is overcome by the centrifugal switch means 44. Thus in operation, as the generator reaches a predetermined speed so that the switch means 46 causes contacts 52 and 54 to be closed, the main field 12 will be energized. When this predetermined speed is exceeded sufficiently, the switch means 44 will cause contacts 48 and 50 to open. The opening of contacts 48 and 50 will open the shunt circuit around the bucking field 14 so that the field 14 is excited from battery 36 through the winding 56 so that both the field winding 14 and coil winding 56 may be designed to operate at one half of the battery 36 voltage and the field winding 14 may at this voltage oppose the excitation of field 12. This will reduce the alternator output which is controlled by the voltage regulator relay 66. It is clearly apparent that as the speed of the generator is reduced to the predetermined setting of the switch means 44, the contacts 48 and 50 will close so that the alternator 10 will be excited by the main field 12 only as long as its speed of rotation is between the limits as determined by the settings of the centrifugal switches 44 and 46.

Figure 2:
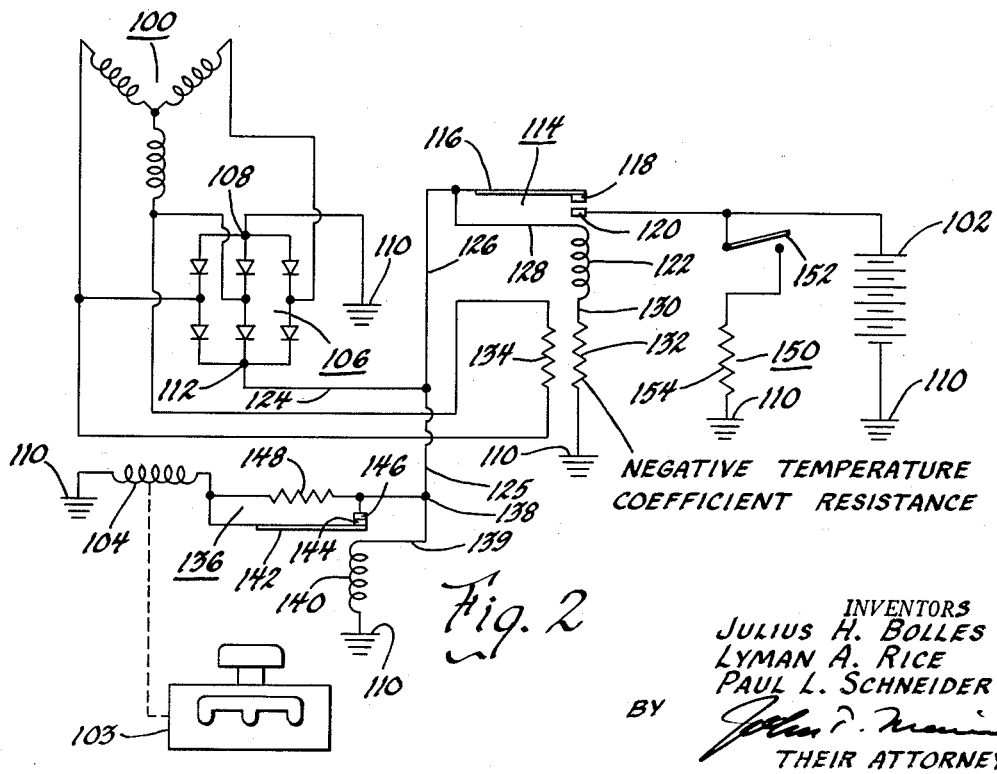
Figure 2 shows a wire diagram of a modification of the present invention for connecting the generator and rectifier to the battery when the output of the generator exceeds a predetermined value.

In Figure 2 another embodiment of the present invention is shown wherein the output terminal of an alternator 100 is automatically connected in circuit with a battery 102 when the output of the alternator 100 is sufficient to charge the battery 102. In this embodiment the alternator 100 is of the well known self-exciting type that is adapted to be driven by a variable speed prime mover 103 such as is used with an automobile. As previously described, the alternator may be of the inductor type and have three-phase star connected windings which are excited by a single field 104. The output of the alternator is impressed across a suitable rectifier 106 which has one of its D.C. output terminals 108 grounded at 110 and its other D.C. outlet terminal 112 connected in a circuit through a line relay 114 with one terminal of the battery 102 which has its other terminal grounded at 110. The line relay 114 is provided with a movable armature 116 and a movable contact 118 that is maintained normally out of engagement with a stationary contact 120 so that the circuit between the output terminal 112 of the rectifier 106 and the battery 102 is maintained normally open until the output of the alternator 100 is of a sufficient magnitude to cause the exciting winding 122 of the line relay 114 to be excited and cause contacts 118 and 120 to close. The exciting winding 122 is responsive to the potential of the output terminal 112 through a circuit that includes wire 124, wire 126, wire 128, wire 130 and a resistance 132 as will be hereinafter described, which is connected to ground 110. The resistance 132 is selected to have a negative temperature coefficient, that is, its ohmic value will vary inversely with its temperature. This property of the resistance is utilized to control the excitation of the exciting winding 122. This control is accomplished by providing a heating element 134 that is suitably connected with the output of alternator 100 so that as the generator starts to develop a current and voltage, the temperature of the heating element 134 will rise and cause a corresponding reduction in the ohmic value of resistance 132. As the ohmic value of resistance 132 is reduced, an increase in current will flow through winding 122 causing the movable armature 116 to be attracted and causing contacts 118 and 120 to close. From the above it is apparent that if the output of the alternator decreases or ceases, the temperature of the heating element 134 is lowered and the ohmic value of the resistance 132 is increased whereby the magnetic attraction of the exciting coil 122 is weakened and the armature 116 is moved by a spring, not shown, to open contacts 118 and 120. In the embodiment shown in Figure 2, a voltage regulator of the type disclosed in the embodiment shown in Figure 1 may be utilized or the voltage regulator 136 of the type shown may be used to control the operation of field 104. The regulator 136 has an exciting winding 140 connected with the output terminal 112 through a circuit that includes wire 124, wire 125, junction 138, and wire 139 which is connected to one end of the exciting coil 140 which has its other end grounded at 110. Winding 140 is adapted to attract a movable armature 142 which carries a movable contact 144 that is adapted to mate with a stationary contact 146. The contacts 144 and 146 are normally closed and are adapted to be opened when the winding 140 responds to a predetermined potential between the output terminal 112 and ground 110. When the contacts are closed, a resistance 148 is shorted from the field 104 exciting circuit. When, however, the contacts open, the resistance 148 is included in the field 104 circuit so as to decrease the field 104 excitation and thereby reduce the output of alternator 100. The load 150 is diagrammatically shown as including a switch 152 and a resistance 154 which is connected to ground 110.

Specifically referring to Figure 3 of the drawings, the area within the dotted lines at 170 indicates an A.C. generator or alternator which includes a stator 172 and a rotor 174. The rotor 174 preferably has the main field coil 176 and reverse field coil 178. These coils are connected, as shown, and are of the conventional type which are designed to provide the alternator with the proper output characteristics. The rotor is driven by engine 173 and the alternating current output of the alternator 170 passes through three wires 180, 182 and 184 to a power rectifier 186. The direct current output of the rectifier 186 passes through wires 188 and 190 wherein the wire 188 leads to ground. The wire 190 is connected to a voltage regulator indicated within the dotted lines at 192. The voltage regulator 192 includes the usual coils, resistances and contacts so as to be capable of regulating the current passing to a battery 193 during operating and charging periods. During periods when the battery voltage is normal, the contacts 194 of the regulator 192 will constantly be vibrating due to the energization of the coil 196 whereby the main coil 176 of the rotor 174 of the alternator is only slightly excited so that the alternator output is controlled to a predetermined value. In this manner, contacts 194 are opened and closed to maintain the battery 193 at full charge and to regulate the output of the alternator 170 due to the inclusion or omission of resistance 195 in the field circuit. When the battery voltage drops below a predetermined fixed charge figure, the coil 196 has insufficient strength to open contacts 194 whereupon the ground circuit remains closed and the output of the alternator is stepped up due to increased excitation of the coil 176 as resistance 195 is shunted out from the circuit and the excitation of the field 176 is at maximum.

Wire 190 leading from rectifier 186 also connects to a cutout or load relay 202 which has a pair of contacts 204 in series with the battery 193 and the output of the power rectifier 186. Contacts 204 are open when the engine is not running so that no circuit exists between the rectifier 186 and battery 193. Contacts 204 are controlled, however, by an actuating coil 206 of the cutout or load relay which, when energized, causes the contacts to close. The coil 206 has one end connected to ground and the other end connected to a suitable pressure switch 212 that is connected through junction 214 with the battery 193. Thus, it will be noted that contacts 204 of the load relay are only capable of being closed by energization of the coil 206 which is solely dependent upon the closing of the contacts of switch 212 which is selected to be responsive to the operation of the prime mover which drives the alternator. The switch 212 is preferably of the well known pressure responsive type and connected with the oil pressure lubrication system 213 of engine 173.

The ignition circuit of the vehicle comes from the battery 193 and is controlled by closure of an ignition switch 216.

It will be noted that the open relay contacts 204 cannot be closed by merely closing the ignition switch 216 but remain open until the engine 173, which drives the alternator 170, is in operation as determined by switch 212 which is responsive to the lubricating oil pressure of the engine. This condition arises since the energization of the coil 206 is solely dependent upon the closing of the circuit by switch 212 to eliminate a common undesirable condition which prevails when the engine ceases to operate and the ignition switch remains in closed position, namely, the grounding of the battery through the cutout coil. This condition is a serious fault in prior art systems.

It is to be understood that alternator type electrical systems, as herein described, have the ability to provide a substantially high voltage and also to maintain satisfactory operating outputs at low engine and vehicle speeds. Further, the alternating current output of the alternator may be used directly for fluorescent lighting, etc. The rectified D.C. portion of the output is used for battery charging only while the battery output is used for ignition and usual lighting functions.

While the embodiments of the present invention as herein disclosed, constitute preferred forms, it is to be understood that other forms might be adopted.

What is claimed is as follows:

1. An electrical system for a motor vehicle having a variable speed driving engine comprising, an alternator connected to be driven by said engine having an output winding and a field winding, a storage battery, a rectifier, means connecting said rectifier and battery with said alternator so as to establish a charging circuit for charging the battery from the alternator through said rectifier, voltage regulating means connected with said rectifier and field winding and operable to vary the supply of rectified current to said field winding so as to control the output voltage of said alternator, a load relay having first switch contacts in said charging circuit for controlling the same, a magnet coil for operating said first switch contacts to a closed position, second switch means for completing a circuit for said magnet coil, means responsive to the oil pressure of said engine for operating said second switch means, and a third switch connected between said charging circuit and said field winding for energizing said field winding from said battery when said first switch contacts are open.

2. An electrical system for a motor vehicle having a variable speed driving engine comprising, an alternator driven by said engine having an output winding and a field winding, a storage battery, a rectifier, means connecting said rectifier and battery with said alternator so as to establish a charging circuit for charging the battery from the alternator through said rectifier, voltage regulating means connected with said rectifier and field winding and operable to vary the supply of rectified current to said field winding so as to control the output voltage of said alternator, a load relay having first switch contacts in said charging circuit for controlling the same, a magnet coil for operating said first switch contacts to a closed position, means responsive to engine oil pressure for controlling the energization of said magnet coil, and a circuit including second switch contacts for energizing said field winding from said battery.

3. An electrical system for a motor vehicle having a variable speed engine comprising, an alternator driven by said engine having an output winding and a field winding, a storage battery, a rectifier, first manually operable switch means, second switch means controlled in response to engine operation and constructed and arranged to be closed when said engine is in operation and to be opened when said engine is at rest, conductor means connected with one side of said battery, means connecting said first manually operable switch means between said conductor means and said field winding, and means connecting said second switch means between said conductor means and said rectifier.

4. The electrical system according to claim 3 wherein the second switch means is operative in response to engine oil pressure.

References Cited in the file of this patent

UNITED STATES PATENTS

| | | |
|---|---|---|
| 1,114,759 | Heyroth | Oct. 27, 1914 |
| 1,335,120 | Lum | Mar. 30, 1920 |
| 1,421,285 | Mikolasek | June 27, 1922 |
| 1,455,697 | Yonge | May 15, 1923 |
| 1,876,548 | Atherton | Sept. 13, 1932 |
| 1,950,722 | Fitzgerald | Mar. 13, 1934 |
| 1,954,931 | Hambuechen | Apr. 17, 1934 |
| 2,078,608 | Maurer | Apr. 27, 1937 |
| 2,117,019 | Conrad | May 10, 1938 |
| 2,117,141 | Breer et al. | May 10, 1938 |
| 2,421,645 | Partington | June 3, 1947 |
| 2,494,749 | Fagen et al. | Jan. 17, 1950 |
| 2,557,298 | Leece et al. | June 19, 1951 |
| 2,558,644 | Claytor | June 26, 1951 |